(12) United States Patent
Holmes

(10) Patent No.: US 6,222,526 B1
(45) Date of Patent: Apr. 24, 2001

(54) HAND HELD ERGONOMIC COMPUTER CONTROLLER

(76) Inventor: Quentin J. Holmes, 1515 Clearview Drive, Peterborough, Ontario (CA), K9K 2A5

( * ) Notice: Subject to any disclaimer, the term of this patent is extended or adjusted under 35 U.S.C. 154(b) by 0 days.

(21) Appl. No.: 09/182,547

(22) Filed: Oct. 29, 1998

(51) Int. Cl.[7] .................................................. G09G 5/08

(52) U.S. Cl. .............................. 345/161; 345/167; 463/38

(58) Field of Search .................................... 345/161, 167, 345/169, 157, 158, 184; 463/36–39

(56) References Cited

U.S. PATENT DOCUMENTS

| | | | |
|---|---|---|---|
| 5,615,083 | * | 3/1997 | Burnett .................................. 361/686 |
| 5,648,798 | * | 7/1997 | Hamling ................................ 345/163 |
| 5,726,684 | * | 3/1998 | Blankenship et al. ............... 345/167 |
| 5,764,164 | * | 6/1998 | Cartabiano et al. .................. 341/22 |
| 5,956,018 | * | 9/1999 | Pejic et al. ............................ 345/157 |
| 6,052,070 | * | 4/2000 | Kivela et al. ......................... 341/122 |

* cited by examiner

Primary Examiner—Richard Hjerpe
Assistant Examiner—Alexander Eisen

(57) ABSTRACT

A hand held ergonomic computer controller is provided including a housing having a lower extent taking the form of a grip and an upper extent with a cross-sectional area greater than that of the lower extent. At least one button is mounted on the housing. Also included is either a trackball or a joystick mounted on the upper extent of the housing.

1 Claim, 4 Drawing Sheets

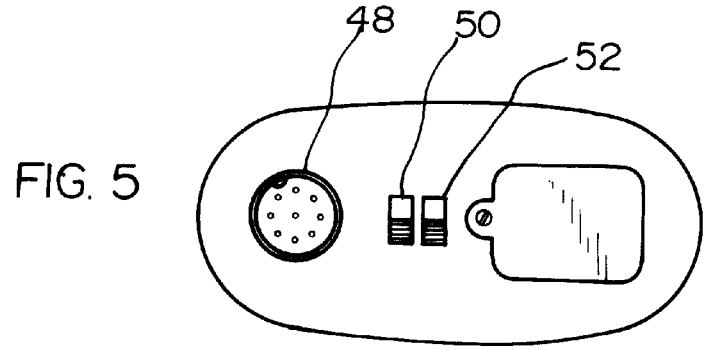
FIG. 5
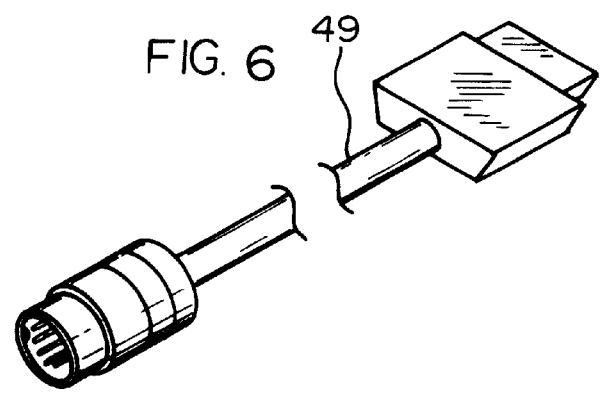
FIG. 6
FIG. 7
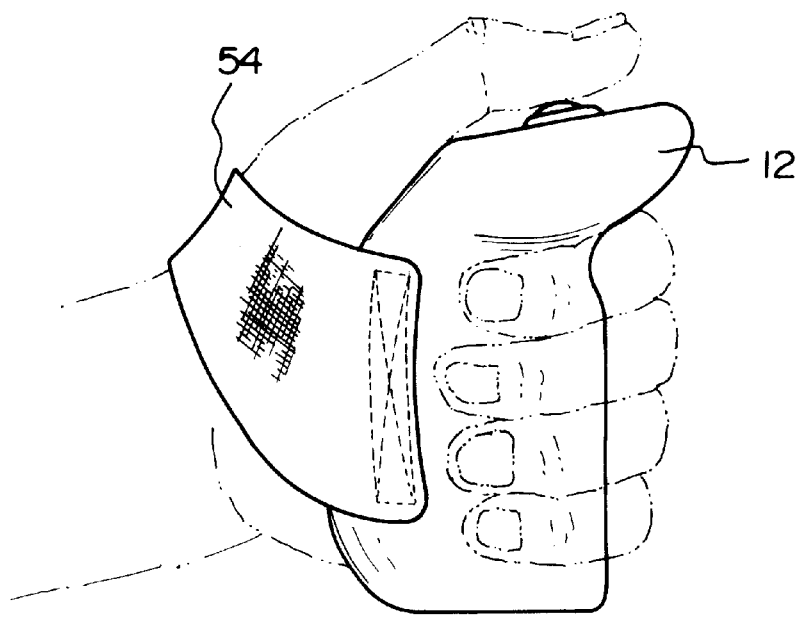

HAND HELD ERGONOMIC COMPUTER CONTROLLER

BACKGROUND OF THE INVENTION

1. Field of the Invention

The present invention relates to computer mouse systems and more particularly pertains to a new hand held ergonomic computer controller for controlling a computer or game unit in a comfortable, convenient manner.

2. Description of the Prior Art

The use of computer mouse systems is known in the prior art. More specifically, computer mouse systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art computer mouse systems include U.S. Pat. Nos. 5,668,574; 5,175,534; 5,287,090; 5,648,798; 5,503,040; and U.S. Pat. No. Des. 359,479.

In these respects, the hand held ergonomic computer controller according to the present invention substantially departs from the conventional concepts and designs of the prior art, and in so doing provides an apparatus primarily developed for the purpose of controlling a computer or game unit in a comfortable, convenient manner.

SUMMARY OF THE INVENTION

In view of the foregoing disadvantages inherent in the known types of computer mouse systems now present in the prior art, the present invention provides a new hand held ergonomic computer controller construction wherein the same can be utilized for controlling a computer or game unit in a comfortable, convenient manner.

The general purpose of the present invention, which will be described subsequently in greater detail, is to provide a new hand held ergonomic computer controller apparatus and method which has many of the advantages of the computer mouse systems mentioned heretofore and many novel features that result in a new hand held ergonomic computer controller which is not anticipated, rendered obvious, suggested, or even implied by any of the prior art computer mouse systems, either alone or in any combination thereof.

To attain this, the present invention generally comprises a housing defined by a lower extent with a generally constant elliptical horizontal cross-section along a height thereof. An intermediate extent of the housing is integrally coupled to the lower extent with a generally elliptical horizontal cross-section along a height thereof. As shown in FIGS. 1,2 & 4, the intermediate extent has a top portion and a bottom portion each with a common horizontal cross-sectional area which is less than that of the lower extent. A middle portion of the intermediate extent of the housing has a horizontal cross-sectional area which is more than that of the lower extent. The housing further has an upper extent integrally coupled to the intermediate extent. Such upper extent includes a neck which tapers upwardly and outwardly with respect to the intermediate extent. Further, the upper extent is equipped with a generally planar circular top face which resides in a plane that forms about a 80 degree angle with an axis about which the lower extent and the intermediate extent resides. For reasons that will soon become apparent, a square port is formed in a central extent of the top face. Next provided is a horizontally oriented trigger button positioned on a front of the top portion of the intermediate extent of the housing. Ends of the trigger button essentially flank foci defined by the elliptical horizontal cross-section of the intermediate extent. Associated therewith is a pair of arcuate buttons mounted on the top face of the upper extent of the housing. These arcuate buttons flank a pair of corners of the square port of the housing, as shown in FIG. 3. The corners of the port essentially bisect the arcuate buttons. Shown in the Figures is a trackball adapter including a box with a top face having a spherical bore formed therein. A ball is positioned within the box and protrudes from the bore for manipulation by a user. The box further includes a connector mounted on a bottom face thereof. Such connector is adapted for releasably connecting with a connector within the port of the housing when the trackball adapter is inserted therein. As shown in FIG. 8, a joystick adapter is provided with structure similar to the trackball adapter with the exception of a rod pivotally coupled thereon with a cylindrical inboard portion and an enlarged disk-shaped outboard portion. While not shown, a radio transmitter is mounted within the housing and connected to the connector of the port and the buttons. In use, the transmitter serves for indicating to a computer the manipulation of one of the adapters and the buttons via free space in a first mode of operation. Associated with the transmitter is a socket mounted on the bottom face of the lower extent of the housing and removably connected to a line coupled to the computer. When the present invention is operating in a second mode of operation, the socket is adapted for indicating to the computer the manipulation of one of the adapters and the buttons via the line. Governing the present invention is a toggle switch mounted on the bottom face of the housing. The toggle switch has a first orientation for operating the controller in the first mode of operation and a second orientation for operating the controller in the second mode of operation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand held ergonomic computer controller apparatus and method which has many of the advantages of the computer mouse systems mentioned heretofore and many novel features that result in a new hand held ergonomic computer controller which is not anticipated, rendered obvious, suggested, or even implied by any of the prior art computer mouse systems, either alone or in any combination thereof.

It is another object of the present invention to provide a new hand held ergonomic computer controller which may be easily and efficiently manufactured and marketed.

It is a further object of the present invention to provide a new hand held ergonomic computer controller which is of a durable and reliable construction.

An even further object of the present invention is to provide a new hand held ergonomic computer controller which is susceptible of a low cost of manufacture with regard to both materials and labor, and which accordingly is then susceptible of low prices of sale to the consuming public, thereby making such hand held ergonomic computer controller economically available to the buying public.

Still yet another object of the present invention is to provide a new hand held ergonomic computer controller which provides in the apparatuses and methods of the prior art some of the advantages thereof, while simultaneously overcoming some of the disadvantages normally associated therewith.

Still another object of the present invention is to provide a new hand held ergonomic computer controller for controlling a computer or game unit in a comfortable, convenient manner.

Even still another object of the present invention is to provide a new hand held ergonomic computer controller that includes a housing having a lower extent taking the form of a grip and an upper extent with a cross-sectional area greater than that of the lower extent. At least one button is mounted on the housing. Also included is either a trackball or a joystick mounted on the upper extent of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a bottom view of the present invention.

FIG. 6 is a perspective view of the line which connects to the socket of the present invention.

FIG. 7 is a side view of an optional strap of the present invention.

DESCRIPTION OF THE PREFERRED EMBODIMENT

Figure 1:
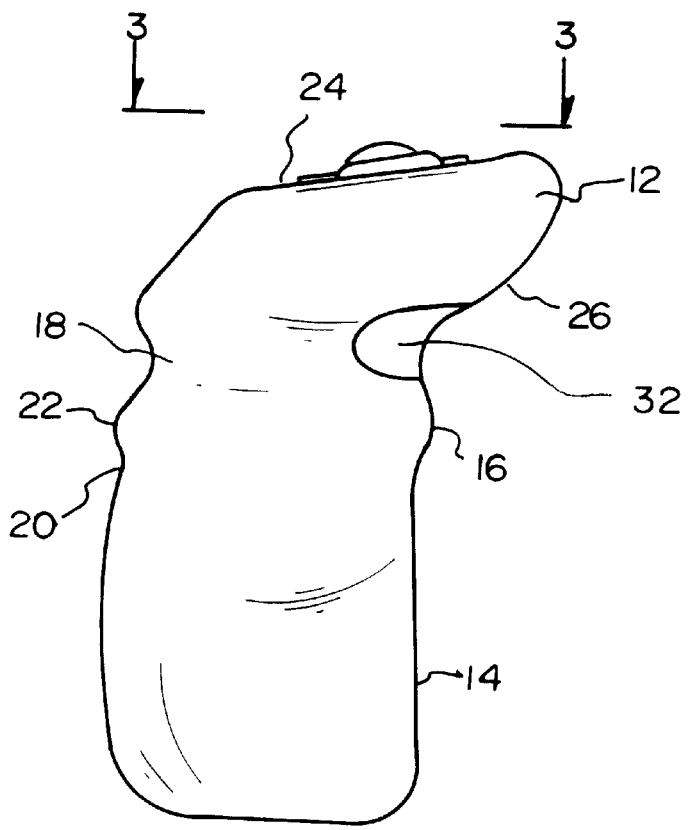
FIG. 1 is a side view of a new hand held ergonomic computer controller according to the present invention.

With reference now to the drawings, and in particular to FIGS. 1 through 8 thereof, a new hand held ergonomic computer controller embodying the principles and concepts of the present invention and generally designated by the reference numeral 10 will be described.

Figure 2:
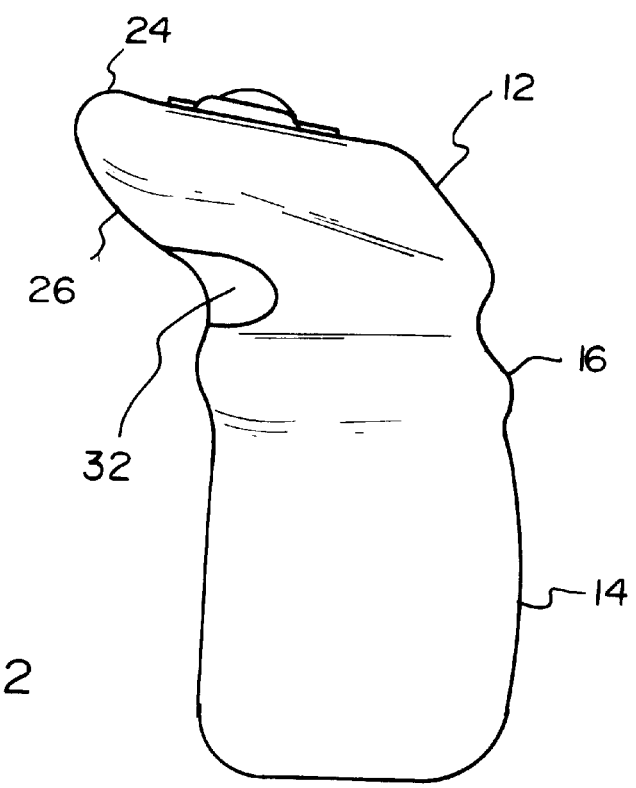
FIG. 2 is another side view of the present invention.
Figure 4:
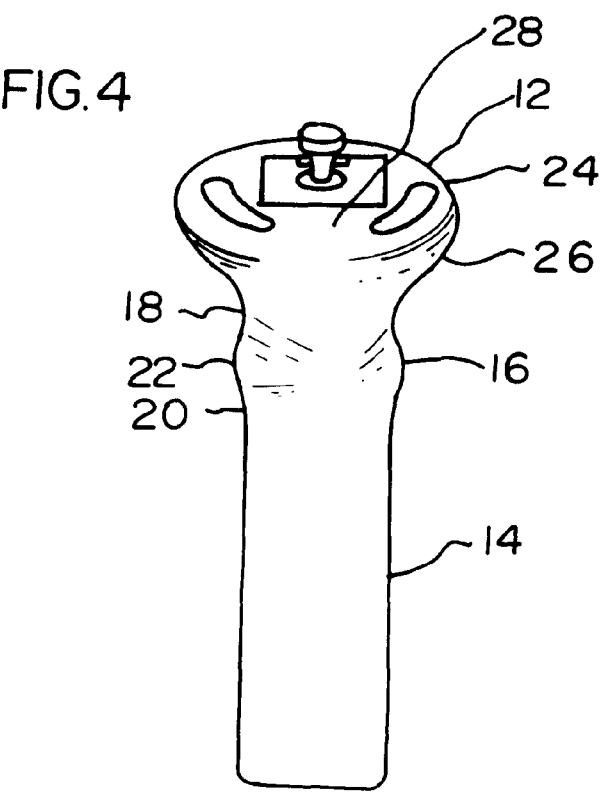
FIG. 4 is a rear view of the present invention.

The present invention, designated as numeral 10, includes a housing 12 defined by a lower extent 14 with a generally constant elliptical horizontal cross-section along a height thereof. An intermediate extent 16 of the housing is integrally coupled to the lower extent with a generally elliptical horizontal cross-section along a height thereof. As shown in FIGS. 1,2 & 4, the intermediate extent has a top portion 18 and a bottom portion 20 each with a common horizontal cross-sectional area which is less than that of the lower extent. A middle portion 22 of the intermediate extent of the housing has a horizontal cross-sectional area which is more than that of the lower extent.

The housing further has a generally disk-shaped upper extent 24 integrally coupled to the intermediate extent. Such upper extent includes a neck 26 which tapers upwardly and outwardly with respect to the intermediate extent. Further, the upper extent is equipped with a generally planar circular top face 28 which resides in a plane that forms about a 80 degree angle with an axis about which the lower extent and the intermediate extent resides. Ideally, a center of the top face has a normal that is offset from a central axis of the lower and intermediate extents of the housing. For reasons that will soon become apparent, a square port 30 is formed in a central extent of the top face.

Figure 3:
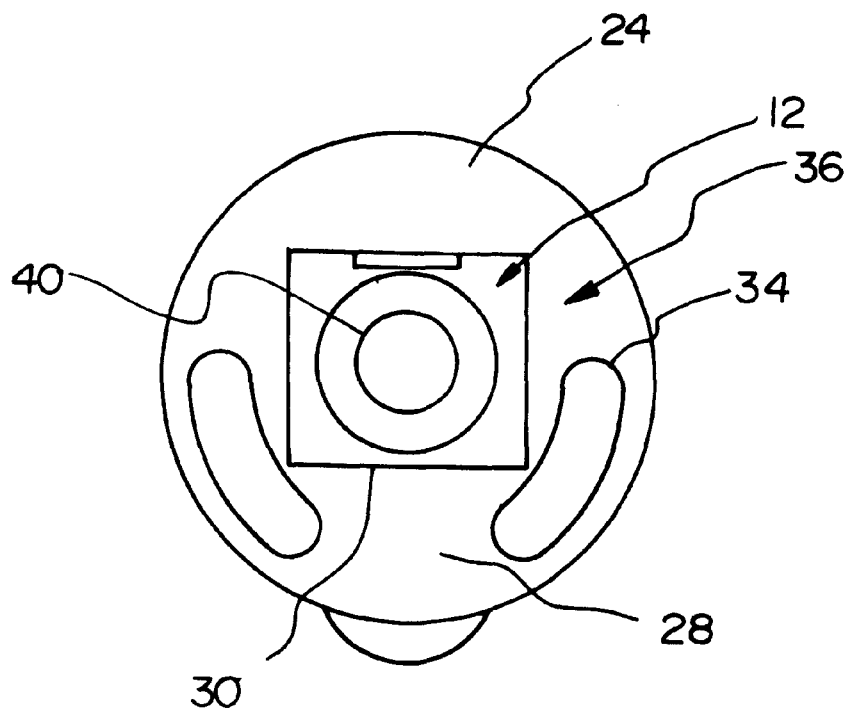
FIG. 3 is a top view of the present invention.

Next provided is a horizontally oriented trigger button 32 positioned on a front of the top portion of the intermediate extent of the housing. Ends of the trigger button essentially flank foci defined by the elliptical horizontal cross-section of the intermediate extent. Associated therewith is a pair of arcuate buttons 34 mounted on the top face of the upper extent of the housing. These arcuate buttons flank a pair of corners of the square port of the housing, as shown in FIG. 3. The corners of the port essentially bisect the arcuate buttons.

Figure 8:
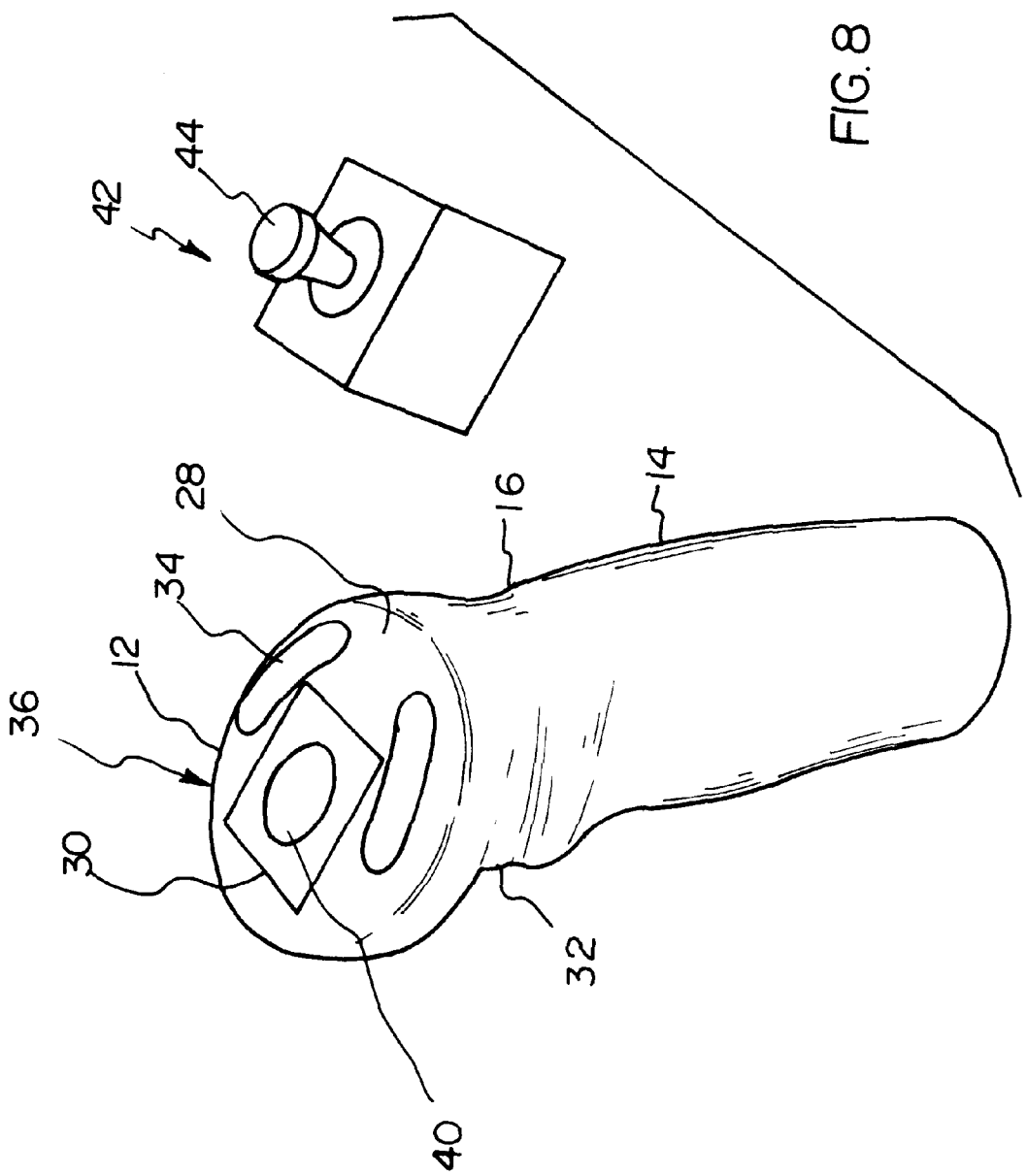
FIG. 8 is an exploded view of the present invention showing both the trackball and the joystick adapter of the present invention.

Shown in the Figures is a trackball adapter 36 including a box 38 with a top face having a spherical bore formed therein. A ball 40 is positioned within the box and protrudes from the bore for manipulation by a user. The box further includes an unillustrated connector mounted on a bottom face thereof. Such connector is adapted for releasably connecting with an unillustrated connector within the port of the housing when the trackball adapter is inserted therein. As an option, any other type of interconnection may be employed. As shown in FIG. 8, a joystick adapter 42 is provided with structure similar to the trackball adapter with the exception of a rod 44 pivotally coupled thereon with a cylindrical inboard portion and an enlarged disk-shaped outboard portion.

While not shown, a radio transmitter is mounted within the housing and connected to the connector of the port and the buttons. In use, the transmitter serves for indicating to a computer the manipulation of one of the adapters and the buttons via free space in a first mode of operation. Of course, the computer would require a receiver for communicating with the transmitter. Further included is a socket 48 mounted on the bottom face of the lower extent of the housing and removably connected to a line 49 coupled to the computer. When the present invention is operating in a second mode of operation, the socket is adapted for indicating to the computer the manipulation of one of the adapters and the buttons via the line.

Governing the present invention is a toggle switch 50 mounted on the bottom face of the housing. The toggle switch has a first orientation for operating the controller in the first mode of operation and a second orientation for operating the controller in the second mode of operation. In the preferred embodiment, another toggle switch 52 is mounted on the housing for accommodating either right or left handed users. Essentially, such toggle switch 52 interchanges the operation of the arcuate buttons.

As an option, a flexible elastic strap 54 has a pair of ends mounted along opposite sides of the lower extent of the housing. The strap extends rearwardly from the housing with a reduced width at a central extent thereof for encompassing a hand of a user. Note FIG. 7.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand held ergonomic computer controller comprising, in combination:

a housing including a lower extent with a generally constant elliptical horizontal cross-section along a height thereof, an intermediate extent integrally coupled to the lower extent with a generally elliptical horizontal cross-section along a height thereof wherein a top portion and a bottom portion of the intermediate extent each has a common horizontal cross-sectional area which is less than that of the lower extent and a middle portion having a horizontal cross-sectional area which is more than that of the lower extent, the housing further having an upper extent integrally coupled to the intermediate extent and including a neck tapering upwardly and outwardly with respect to the intermediate extent and a generally planar circular top face which resides in a plane that forms about a 80 degree angle with an axis about which the lower extent and the intermediate extent resides, wherein a square port is formed in a central extent of the top face, said square port receiving either one of a trackball adapter and a joystick adapter;

a horizontally oriented trigger button positioned on a front of the top portion of the intermediate extent of the housing with ends essentially flanking foci defined by the elliptical horizontal cross-section thereof;

a pair of arcuate buttons mounted on the top face of the upper extent of the housing and flanking a pair of corners of the square port of the housing, wherein the corners essentially bisect the arcuate buttons;

said trackball adapter including a box with a top face having a spherical bore formed therein and a ball positioned within the box and protruding from the bore for manipulation by a user, the box further including a connector mounted on a bottom face thereof for releasably connecting with a connector within the port of the housing when the trackball adapter is inserted therein;

said joystick adapter including a box with a top face having a rod pivotally coupled thereon with a cylindrical inboard portion and an enlarged disk-shaped outboard portion for manipulation by a user, the box of the joystick adapter further including a connector mounted on a bottom face thereof for releasably connecting with a connector within the port of the housing when the joystick adapter is inserted therein;

a radio transmitter mounted within the housing and connected to the connector of the port and the buttons for indicating to a computer the manipulation of one of the adapters and the buttons via free space in a first mode of operation;

a socket mounted on the bottom face of the lower extent of the housing and removably connected to a line coupled to the computer for indicating to the computer the manipulation of one of the adapters and the buttons via the line in a second mode of operation;

a toggle switch mounted on the bottom face of the housing and having a first orientation for operating the controller in the first mode of operation and a second orientation for operating the controller in the second mode of operation; and a flexible elastic strap having a pair of ends mounted along opposite sides of the lower extent and extending rearwardly therefrom with a reduced width at a central extent thereof for encompassing a hand of a user.

* * * * *